R. H. O. McDONOUGH.
FLUSHING APPARATUS.
APPLICATION FILED FEB. 17, 1912.
1,027,622.
Patented May 28, 1912.
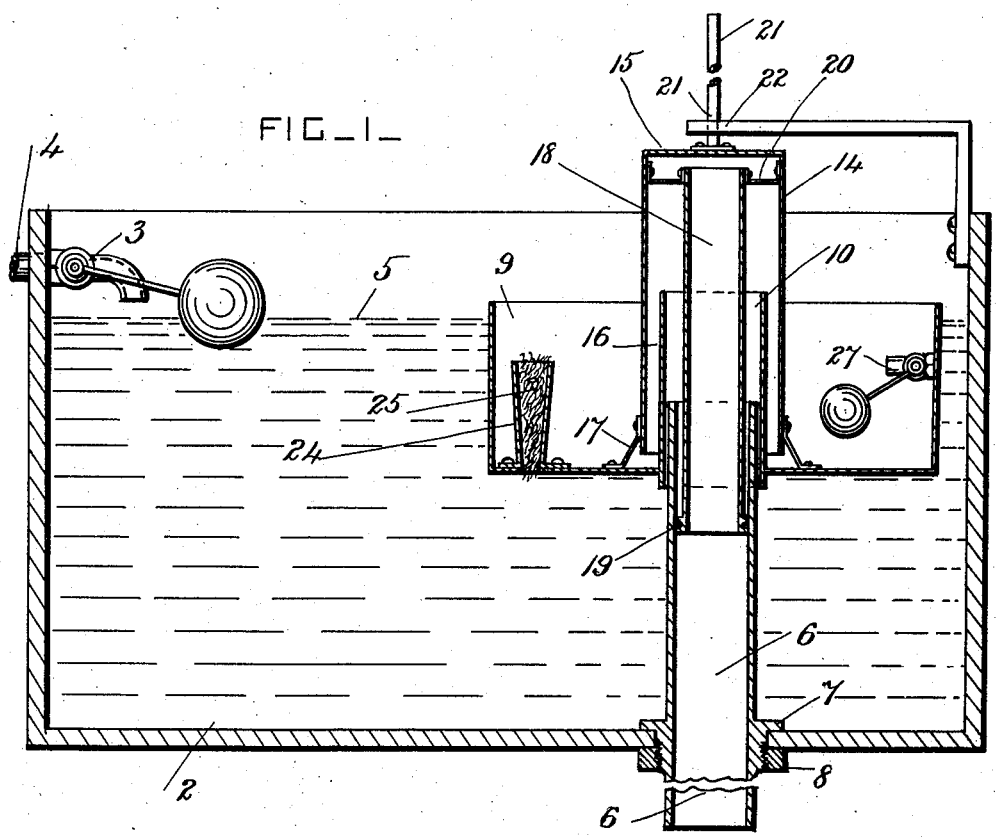
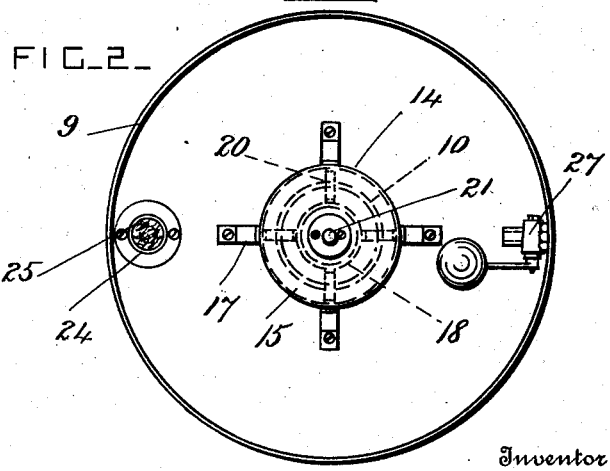
Witnesses
C. P. Fiske.
Paul Finckel
Inventor
Robert H. O. McDonough
By Hubert W. I. Jenner.
Attorney

UNITED STATES PATENT OFFICE.

ROBERT HARVY OLIVER McDONOUGH, OF WASHINGTON, PENNSYLVANIA.

FLUSHING APPARATUS.

1,027,622.  Specification of Letters Patent.  Patented May 28, 1912.

Application filed February 17, 1912. Serial No. 678,317.

*To all whom it may concern:*

Be it known that I, ROBERT H. O. Mc-DONOUGH, a citizen of the United States, residing at Washington, in the county of Washington and State of Pennsylvania, have invented certain new and useful Improvements in Flushing Apparatus; and I do hereby declare the following to be a full, clear, and exact description of the invention, such as will enable others skilled in the art to which it appertains to make and use the same.

This invention relates to flushing apparatus which is adapted to deliver a considerable volume of water at periodic intervals of time; and it consists in the novel construction and combination of the parts hereinafter fully described and claimed.

In the drawings, Figure 1 is a vertical section through one form of flushing apparatus constructed according to this invention. Fig. 2 is a plan view of the float pan.

A water tank 2 is provided, and this tank is furnished with a float or ball valve 3 and an inlet pipe 4, by means of which the tank is filled to a prearranged water level 5, and which operate automatically. An outlet pipe 6 of much larger area than the inlet pipe 4 is secured in a hole in the bottom of the tank, by means of a flange 7 and a nut 8, or in any other approved manner, and this outlet pipe projects vertically in the tank. A float pan or buoyant pan 9 is provided, and has a tube 10 which projects upwardly from its bottom, and which is slidable loosely over the outlet pipe 6. A cylindrical outlet chamber or bell 14 having a closed top 15 is arranged over the tube 10, and an annular outlet passage 16 is formed between the chamber wall and the pipe. The top of the outlet chamber or bell 14 is arranged considerably above the level of the top edge of the float pan, and its lower part is attached at intervals to the bottom of the float pan by fastening strips or wires 17.

A telescopic extension pipe 18 is arranged inside the outlet pipe 6, and is provided with a packing-ring 19 at its lower end portion. The upper end of the telescopic pipe 18 is attached to the upper part of the outlet chamber 14 at intervals by fastening bands or wires 20, so that the telescopic pipe 18 slides up and down with the float pan. A guide rod 21 projects from the top of the outlet chamber 14, and slides in a guide 22 which is secured to the tank.

The float pan is provided with a regulator 24 which preferably consists of a conical tube which projects upwardly from its bottom, and which is filled with cotton wick 25. The object of this regulator is to provide a means to admit a small trickle of water from the tank to the float pan. A float valve 27 is also provided which opens automatically when the pan is about three-quarters full of water, so that the float pan may then fill more rapidly.

When the parts are in the positions shown in Fig. 1, the water trickles through the regulator into the float pan, until the said pan has remained in its raised position for the prearranged interval of time between consecutive flushing actions. The water in the float pan then opens the float valve 27, and the float pan then fills rapidly and sinks by gravity to the bottom of the tank. The water in the tank now rushes through the float pan, up the annular passage 16, and down the telescopic extension pipe 18 and the outlet pipe 6, and is used for flushing or other purposes.

The outlet pipe and its extension pipe 18 operate as the long leg of a siphon, so that all the water in the tank which can run out through the float pan is let out, and the float pan is substantially emptied of water, at each flushing operation. The siphon removes the water from the float pan faster than the tank is supplied by its inlet pipe 4, and when the buoyancy of the float pan has been restored, the upper part of the float pan rises above the surface of the water in the water tank, and the pan ascends with the rising water to its original position. The regulator 24 is set so that the float pan descends automatically at periodic intervals of time.

The float valve 27 can be omitted if desired, but its use enables the float pan to descend with greater precision and to start the siphoning action of the outlet pipe to better advantage than when the float pan is filled wholly by means of the water which trickles through the regulator.

What I claim is:

1. The combination, with a water tank, and an outlet pipe projecting upwardly therein; of a float pan provided with a tube which encircles the outlet pipe, an outlet chamber or bell connected to the float pan and having an inlet at the bottom of the float pan, a telescopic extension pipe slidable in the outlet pipe and having its upper end connected to the upper part of the outlet chamber, and a regulator for admitting water from the tank to the float pan in a small stream.

2. The combination, with a water tank, and an outlet pipe projecting upwardly therein; of a float pan provided with a tube which encircles the outlet pipe, an outlet chamber or bell connected to the float pan and having an inlet at the bottom of the float pan, a telescopic extension pipe slidable in the outlet pipe and having its upper end connected to the upper part of the outlet chamber, a regulator for admitting water from the tank to the float pan in a small stream, and a float valve carried by the float pan and operating to admit water freely to it from the tank when the float pan has been filled by the regulator to a prearranged extent.

3. The combination, with a water tank, and an outlet pipe projecting upwardly therein; of a float pan provided with a tube which encircles the outlet pipe, an outlet chamber or bell connected to the float pan and having an inlet at the bottom of the float pan, a telescopic extension pipe slidable in the outlet pipe and having its upper end connected to the upper part of the outlet chamber, and a conical regulator tube packed with pervious material and projecting upwardly from the bottom of the float pan and operating to admit water to it from the tank in a small stream.

In testimony whereof I have affixed my signature in the presence of two witnesses.

ROBERT HARVY OLIVER McDONOUGH.

Witnesses:
J. C. BRYANT,
R. W. KNOX.

Copies of this patent may be obtained for five cents each, by addressing the "Commissioner of Patents, Washington, D. C."